United States Patent
Barrus

(10) Patent No.: US 9,053,455 B2
(45) Date of Patent: Jun. 9, 2015

(54) PROVIDING POSITION INFORMATION IN A COLLABORATIVE ENVIRONMENT

(75) Inventor: John Barrus, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/041,792

(22) Filed: Mar. 7, 2011

(65) Prior Publication Data

US 2012/0233553 A1  Sep. 13, 2012

(51) Int. Cl.
| | |
|---|---|
| H04M 3/56 | (2006.01) |
| G06Q 10/10 | (2012.01) |
| G09B 5/12 | (2006.01) |
| B43L 1/00 | (2006.01) |
| G09B 5/02 | (2006.01) |
| H04M 7/00 | (2006.01) |

(52) U.S. Cl.
CPC ...... *G06Q 10/10* (2013.01); *G09B 5/12* (2013.01); *B43L 1/00* (2013.01); *G09B 5/02* (2013.01); *H04M 3/567* (2013.01); *H04M 7/0027* (2013.01); *H04M 2203/1025* (2013.01)

(58) Field of Classification Search
USPC .......................................................... 715/751
See application file for complete search history.

(56) References Cited

U.S. PATENT DOCUMENTS

| | | | |
|---|---|---|---|
| 5,025,314 A * | 6/1991 | Tang et al. | 348/14.08 |
| 5,400,069 A | 3/1995 | Braun et al. | |
| 5,570,301 A | 10/1996 | Barrus | |
| 5,790,114 A | 8/1998 | Geaghan et al. | |
| 5,844,569 A | 12/1998 | Eisler et al. | |
| 6,070,247 A | 5/2000 | Wallace et al. | |
| 6,707,444 B1 | 3/2004 | Hendriks et al. | |
| 6,772,335 B2 | 8/2004 | Curtis et al. | |
| 6,917,033 B2 | 7/2005 | Hendriks et al. | |
| 6,963,334 B1 | 11/2005 | Stevens et al. | |
| 6,985,620 B2 | 1/2006 | Sawhney et al. | |
| 7,170,526 B1 | 1/2007 | Johnson | |
| 7,219,233 B1 | 5/2007 | Hendriks et al. | |
| 7,242,389 B1 | 7/2007 | Stern | |
| 7,355,584 B2 | 4/2008 | Hendriks et al. | |
| 7,554,576 B2 | 6/2009 | Erol et al. | |
| 7,634,540 B2 | 12/2009 | Ivashin et al. | |
| 7,791,597 B2 | 9/2010 | Siverstein et al. | |

(Continued)

FOREIGN PATENT DOCUMENTS

| | | |
|---|---|---|
| CN | 1473292 A | 2/2004 |
| CN | 1617129 A | 5/2005 |

(Continued)

OTHER PUBLICATIONS

U.S. Appl. No. 13/041,769, filed Mar. 7, 2011 by John Barrus.

(Continued)

*Primary Examiner* — Steven Sax
*Assistant Examiner* — David Choi
(74) *Attorney, Agent, or Firm* — Kilpatrick Townsend & Stockton LLP

(57) ABSTRACT

In systems that enable collaboration, techniques are provided for communicating and displaying positional information with respect to these systems so as to enhance the collaborative experience. The systems may include interactive whiteboard (IWB) systems participating in a collaborative session. The position of an object (e.g., a user) at a first IWB system may be tracked and displayed at a second IWB system located remotely from the first IWB system.

17 Claims, 5 Drawing Sheets

(56) References Cited

U.S. PATENT DOCUMENTS

| | | | |
|---|---|---|---|
| 8,125,510 B2 | 2/2012 | Agarwal et al. | |
| 8,180,567 B2 | 5/2012 | Geelen et al. | |
| 8,195,952 B2 | 6/2012 | Andreev et al. | |
| 8,234,578 B2* | 7/2012 | Ferren et al. | 715/753 |
| 8,352,180 B2 | 1/2013 | Geelen et al. | |
| 8,355,038 B2 | 1/2013 | Robinson et al. | |
| 8,390,718 B2 | 3/2013 | Robinson et al. | |
| 8,698,873 B2 | 4/2014 | Barrus | |
| 2001/0051876 A1 | 12/2001 | Seigel et al. | |
| 2002/0135536 A1 | 9/2002 | Bruning | |
| 2002/0196327 A1 | 12/2002 | Riu et al. | |
| 2003/0058227 A1 | 3/2003 | Hara et al. | |
| 2003/0065722 A1 | 4/2003 | Ieperen | |
| 2003/0070072 A1 | 4/2003 | Nassiri | |
| 2003/0078840 A1 | 4/2003 | Strunk et al. | |
| 2003/0138135 A1 | 7/2003 | Chung et al. | |
| 2003/0236792 A1 | 12/2003 | Mangerie et al. | |
| 2004/0070616 A1 | 4/2004 | Hildebrandt et al. | |
| 2004/0199639 A1 | 10/2004 | Harris | |
| 2005/0093948 A1 | 5/2005 | Morris et al. | |
| 2005/0104864 A1 | 5/2005 | Zhang et al. | |
| 2006/0053230 A1 | 3/2006 | Montero | |
| 2006/0092178 A1 | 5/2006 | Tanguay, Jr. et al. | |
| 2006/0285689 A1 | 12/2006 | Selve | |
| 2007/0216660 A1 | 9/2007 | Sposato et al. | |
| 2007/0245407 A1 | 10/2007 | Lester et al. | |
| 2008/0043100 A1 | 2/2008 | Sobel | |
| 2008/0089586 A1 | 4/2008 | Igarashi et al. | |
| 2008/0316348 A1 | 12/2008 | Hallock | |
| 2009/0002346 A1 | 1/2009 | Henning et al. | |
| 2009/0019360 A1 | 1/2009 | Lynggaard et al. | |
| 2009/0021495 A1 | 1/2009 | Edgecomb et al. | |
| 2009/0063492 A1 | 3/2009 | Meyyappan et al. | |
| 2009/0073129 A1 | 3/2009 | Sirotich et al. | |
| 2009/0116703 A1 | 5/2009 | Schultz | |
| 2009/0146973 A1 | 6/2009 | Ung et al. | |
| 2009/0160818 A1 | 6/2009 | Wilde et al. | |
| 2009/0173856 A1 | 7/2009 | Auger et al. | |
| 2009/0173867 A1 | 7/2009 | Auger et al. | |
| 2009/0183228 A1 | 7/2009 | Dasch et al. | |
| 2009/0244278 A1 | 10/2009 | Taneja et al. | |
| 2009/0271848 A1 | 10/2009 | Leung et al. | |
| 2009/0309956 A1* | 12/2009 | Hawkins et al. | 348/14.08 |
| 2009/0315861 A1 | 12/2009 | Zhang et al. | |
| 2010/0037273 A1 | 2/2010 | Dressel et al. | |
| 2010/0049626 A1 | 2/2010 | Hong et al. | |
| 2010/0073330 A1 | 3/2010 | Ericson et al. | |
| 2010/0149349 A1 | 6/2010 | Kroeker et al. | |
| 2010/0153160 A1 | 6/2010 | Bezemer et al. | |
| 2010/0178645 A1 | 7/2010 | Ieperen et al. | |
| 2010/0182285 A1 | 7/2010 | Tremblay | |
| 2010/0188478 A1* | 7/2010 | Robinson et al. | 348/14.16 |
| 2010/0194708 A1 | 8/2010 | Popovich | |
| 2010/0231556 A1 | 9/2010 | Mines et al. | |
| 2010/0281287 A1 | 11/2010 | Doerksen et al. | |
| 2010/0289776 A1 | 11/2010 | Bryborn Krus et al. | |
| 2010/0293601 A1 | 11/2010 | Schultz et al. | |
| 2010/0293605 A1 | 11/2010 | Longobardi | |
| 2010/0315413 A1* | 12/2010 | Izadi et al. | 345/419 |
| 2010/0315994 A1 | 12/2010 | Lam | |
| 2011/0013001 A1 | 1/2011 | Craven-Bartle et al. | |
| 2011/0084893 A1 | 4/2011 | Lee et al. | |
| 2011/0109554 A1* | 5/2011 | Boissier | 345/166 |
| 2011/0181520 A1 | 7/2011 | Boda et al. | |
| 2011/0234746 A1 | 9/2011 | Saleh et al. | |
| 2011/0320961 A1 | 12/2011 | Sriraghavan et al. | |
| 2012/0030756 A1 | 2/2012 | Todd | |
| 2012/0110007 A1 | 5/2012 | Cohen et al. | |
| 2012/0117514 A1* | 5/2012 | Kim et al. | 715/849 |
| 2012/0218304 A1 | 8/2012 | Anzures et al. | |
| 2012/0229425 A1 | 9/2012 | Barrus et al. | |
| 2012/0229589 A1 | 9/2012 | Barrus | |
| 2012/0229590 A1 | 9/2012 | Barrus | |
| 2012/0233553 A1* | 9/2012 | Barrus | 715/751 |
| 2012/0233615 A1 | 9/2012 | Barrus | |
| 2012/0274584 A1 | 11/2012 | Schweikart | |
| 2012/0278388 A1 | 11/2012 | Kleinbart et al. | |
| 2012/0280948 A1 | 11/2012 | Barrus et al. | |
| 2012/0281092 A1 | 11/2012 | Olivier et al. | |

FOREIGN PATENT DOCUMENTS

| | | |
|---|---|---|
| CN | 101436136 A | 3/2009 |
| CN | 101657826 A | 2/2010 |
| CN | 101819511 A | 9/2010 |
| EP | 1 613 084 A2 | 1/2006 |
| JP | H06-243076 A | 9/1994 |
| JP | 2000-043486 A | 2/2000 |
| JP | 2007-158601 A | 6/2007 |
| JP | 2008-257660 A | 10/2008 |
| JP | 2009-151508 A | 7/2009 |
| JP | 2012-507052 A | 3/2012 |
| WO | WO 94/07327 A1 | 3/1994 |
| WO | WO 01/10121 A1 | 2/2001 |
| WO | WO 2006/071637 A2 | 7/2006 |
| WO | WO 2010/053803 A1 | 5/2010 |
| WO | 2010/100157 A1 | 9/2010 |

OTHER PUBLICATIONS

U.S. Appl. No. 13/041,805, filed Mar. 7, 2011 by John Barrus.
U.S. Appl. No. 13/041,838, filed Mar. 7, 2011 by John Barrus.
U.S. Appl. No. 13/041,910, filed Mar. 7, 2011 by John Barrus et al.
U.S. Appl. No. 13/102,963, filed May 6, 2012 by John Barrus et al.
"Hitachi to Bundle EverNote Software and Technologies With StarBoard Products", Ritescript Press Releases, Nov. 7, 2007, Evernote Corp., 2 pages.
Baker at el., "Computation and Performance Issues in Coliseum, an Immersive Videoconferencing System", Jul. 15, 2003, Mobile and Media Systems Laboratory, HP Laboratories, Palo Alto, USA, 18 pages.
Bezaitis, "New Technologies for Aging in Place", Aging Well, vol. 1 No. 2 p. 26, Spring 2008, Great Valley Publishing Co., Inc., Spring City, USA, 4 pages.
Cisco WebEx Meeting Center—Product Overview: Share ideas with anyone, anywhere—online, Copyright 2011, Cisco Systems, Inc., 2 pages.
Citrix Online, Product Overview|Web Conferencing, Collaboration Tools, Copyright 2011, Citrix Online, 4 pages.
CopyCam Installation and Operation Guide, Copyright 2009, Steelcase Corporation, 72 pages.
Dibbell, "Gestural Interfaces", Technology Review, May/Jun. 2011, MIT, 1 page.
Hitachi Digital Media, "Ultimate Short Throw LCD Projectors for Business and Education, Preliminary Specifications", Sep. 2010, downloaded from internet http://www.hitachiultimateprojector.com/docs/Ultimate_Short_Throw_Brochure_UK_prelim.pdf, 4 pages.
How Aviary Uses Evernote for WhiteBoard Sessions, Aviary.com, downloaded from internet http://www.youtube.com/watch?v=tmtHJ71JPrc on Apr. 2, 2012, 6 pages.
Ishii et al., "ClearBoard: A Seamless Medium for Shared Drawing and Conversation with Eye Contact", CHI '92, May 3-7, 1992, Association for Computing Machinery, 10 pages.
Ishii et al., "Iterative Design of Seamless Collaboration Media", vol. 37 No. 8, Aug. 1994, Communications of the ACM, Association for Computing Machinery, pp. 84-97, 15 pages.
Kunz et al., "ColloBoard: A Novel Interactive Electronic Whiteboard for Remote Collaboration with People on Content", 2010 International Conference on Cyberworlds, Copyright 2010 IEEE Computer Society, 8 pages.
Larkin, "Editorial Review of *BumpTop*", PCWorld.com, downloaded from internet http://www.pcworld.com/downloads/file/fid,77603/description.html on Sep. 15, 2011, 1 page.
Liao et al., "Robust and Accurate Visual Echo Cancelation in a Full-duplex Projector-camera System", Sep. 9, 2006, 17 pages.
LifeSize Desktop—Superior Standalone HD Desktop Client, Copyright 2010, LifeSize Communications, 2 pages.

(56) References Cited

OTHER PUBLICATIONS

Microsoft® Office Live Meeting Feature Guide, Jan. 2005, Microsoft Corporation, 17 pages.
MimioCapture Ink Recording System, Copyright 2011 DYMO Mimio, downloaded from internet http://www.mimio.dymo.com/en-US/Products/MimioCapture.aspx on Sep. 15, 2011, 1 page.
MimioClassroom Solution, Copyright 2011 DYMO Mimio, downloaded from internet http://www.mimio.dymo.com/en-US/Products/MimioClassroom-Family-ofProducts.aspx on Sep. 15, 2011, 2 pages.
MimioPad Wireless Tablet, Copyright 2011 DYMO Mimio, downloaded from internet http://www.mimio.dymo.com/en-US/Products/MimioPad-Wireless-Tablet.aspx on Sep. 15, 2011, 1 page.
MimioStudio 9 Software, Jan. 2012 Specifications Sheet, DYMO, 2 pages.
MimioStudio Interactive Software, Copyright 2011 DYMO Mimio, downloaded from internet http://www.mimio.dymo.com/en-US/Products/MimioStudio-Software.aspx on Sep. 15, 2011, 1 page.
MimioTeach Interactive System, Copyright 2011 DYMO Mimio, downloaded from internet http://www.mimio.dymo.com/en-US/Products/MimioTeach-Interactive-System.aspx on Sep. 15, 2011, 2 pages.
MimioTeach, Jan. 2012 Specifications Sheet, DYMO, 2 pages.
MimioView Document Camera, Copyright 2011 DYMO Mimio, downloaded from internet http://www.mimio.dymo.com/en-US/Products/MimioView-Document-Camera.aspx on Sep. 15, 2011, 1 page.
Mohan et al., "Bokode: Imperceptible Visual tags for Camera Based Interaction from a Distance", Camera Culture Group, MIT Media Lab, downloaded from internet http://cameraculture.media.mit.edu/bokode on Sep. 15, 2011, 12 pages.
Raskar et al., "The Office of the Future: A Unified Approach to Image-Based Modeling and Spatially Immersive Displays", Jul. 19-24, 1998, SIGGRAPH 98, Orlando, Florida, Computer Graphics Proceedings, Annual Conference Series, 10 pages.
Screen sharing, Skype, downloaded from internet http://www.skype.com/intl/en-us/features/allfeatures/screen-sharing/ on Jan. 18, 2012, 4 pages.
Scriblink, Copyright 2012 Scriblink LLC., downloaded from internet http://www.scriblink.com/index.jsp?act=about on Feb. 7, 2012, 1 page.
SMART Bridgit™ conferencing software, Copyright 2011, SMART Technologies, 2 pages.
SMART Notebook™ 10.8—Mac OS X operating system software User's guide, Copyright 2008-2011, SMART Technologies ULC., 134 pages.
Tan et al., "ConnectBoard: A remote collaboration system that supports gaze-aware interaction and sharing", MMSP 2009: IEEE International Workshop on Multimedia Signal Processing, Oct. 5-7, 2009, Rio de Janeiro, Brazil, ABSTRACT downloaded from internet ieeexplore.ieee.org/xpl/freeabs_all.jsp?arnumber=5293268 on Feb. 7, 2012, 1 page.
Tan et al., "ConnectBoard: Enabling Genuine Eye Contact and Accurate Gaze in Remote Collaboration", IEEE Transactions on Multimedia, vol. 13, No. 3, Jun. 2011, pp. 466-473, 9 page.
Tan et al., "Enabling Genuine Eye Contact and Accurate Case in Remote Collaboration", Presented at IEEE International Conference on Multimedia and Expo, Jul. 19, 2010, Mobile and Media Systems Laboratory, HP Laboratories, Palo Alto, USA, pp. 430-435, 7 pages.
Tang et al., "VideoArms: Embodiments for Mixed Presence Groupware", Sep. 11-15, 2006, Copyright 2006 ACM, London, UK, 16 pages.
VNC Enterprise Edition—Product Information: Overview, Copyright 2011, RealVNC Limited, 2 pages.
Wacom Components: Input Technology, Copyright 2007 Wacom, downloaded from internet http://www.wacom-components.com/english/technology/index.html on Sep. 15, 2011, 2 pages.
Wacom Components: Input Technology: EMR Technology, Copyright 2007 Walcom, downloaded from internet http://www.wacom-components.com/english/technology/emr.html on Sep. 15, 2011, 4 pages.
Wacom Components: Input Technology: Features and Advantages of EMR Technology, Copyright 2007 Wacom, downloaded from internet http://www.wacom-components.com/english/technology/feature.html on Sep. 15, 2011, 2 pages.
Wacom Components: Input Technology: Mobile Equipment, Copyright 2007 Wacom, downloaded from internet http://www.wacom-components.com/english/technology/mobile.html on Sep. 15, 2011, 3 pages.
Wacom Components: Input Technology: Penabled Technology, Copyright 2007 Wacom, downloaded from internet http://www.wacom-components.com/english/technology/penabled.html on Sep. 15, 2011, 1 page.
Wacom Components: Input Technology: Touch Technology, Copyright 2007 Wacom, downloaded from internet http://www.wacom-components.com/english/technology/touch.html on Sep. 15, 2011, 3 pages.
Wilson et al., "Combining Multiple Depth Cameras and Projectors for Interactions on, Above, and Between Surfaces", Oct. 3-6, 2010, UIST '10, ACM, New York, USA, 10 pages.
Non-Final Office Action for U.S. Appl. No. 13/041,769 mailed Aug. 31, 2012, 23 pages.
Katz, "Chemistry in the Toy Store™", 6th Edition, Updated 2002, 13 pages.
Lee, Low-Cost Multi-Point Interactive Whiteboard using the Wiimote, downloaded from internet http://www.youtube.com/watch?v=5s5EvhHy7eQ on Apr. 26, 2012, 2 pages.
Faces in Real-Life Images, downloaded from internet http://people.cs.umass.edu/~elm/realfaces/call.html on Apr. 26, 2012, 2 pages.
Face Recognition Homepage downloaded from internet http://www.face-rec.org/conferences/ on Apr. 26, 2012, 7 pages.
Sticky-Notes.net, downloaded from internet http://www.sticky-notes.net on Apr. 26, 2012, 3 pages.
Mistry, "Quickies, Intelligent Sticky Notes", MIT Media Lab, downloaded from internet http://pranavmistry.com/projects/quickies/ on Apr. 26, 2012, 4 pages.
Quickies: Sticky Notes of 21st Century, downloaded from internet http://www.youtube.com/watch?v=HQT5_4aVvHU on Apr. 26, 2012, 3 pages.
Post-It Digital Notes, downloaded from internet http://download.cnet.com?Post-it-Digital-Notes/3000-2351_4-10060027.html on Apr. 26, 2012, 7 pages.
Non-Final Office Action for U.S. Appl. No. 13/041,805 mailed on Oct. 30, 2012, 8 pages.
Office Action in related Japanese Application No. 2012-047976 dated Nov. 19, 2013, 3 pages.
Advisory Action for U.S. Appl. No. 13/102,963 mailed on Jan. 14, 2014, 3 pages.
Office Action in related Japanese Application No. 2012-047976 dated Apr. 15, 2014, 3 pages.
Non-Final Office Action for U.S. Appl. No. 13/041,805 mailed on Feb. 21, 2014, 5 pages.
Notice of Allowance for U.S. Appl. No. 13/041,769 mailed on Apr. 21, 2014, 7 pages.
Final Office Action for U.S. Appl. No. 13/041,910 mailed on Jun. 20, 2013, 20 pages.
Advisory Action for U.S. Appl. No. 13/041,769 mailed on May 28, 2013, 4 pages.
Final Office Action for U.S. Appl. No. 13/102,963 mailed on Aug. 22, 2013, 10 pages.
Non-Final Office Action for U.S. Appl. No. 13/041,838 mailed on Sep. 5, 2013, 6 pages.
Non-Final Office Action for U.S. Appl. No. 13/102,963 mailed on Jan. 22, 2013, 8 pages.
Non-Final Office Action for U.S. Appl. No. 13/041,910 mailed on Jan. 24, 2013, 17 pages.
Notice of Allowance for U.S. Appl. No. 13/041,769 mailed on Dec. 11, 2013, 11 pages.
Notice of Allowance for U.S. Appl. No. 13/041,838 mailed on Dec. 18, 2013, 9 pages.

(56) References Cited

OTHER PUBLICATIONS

Apperley et al., "Use of Video Shadow for Small Group Interaction Awareness on a Large Interactive Display Surface", The Computer Science Department University of Waikato, Hamilton, New Zealand, 2002, 10 pages.
Extended European Search Report for European Application No. 12156226.8 dated May 9, 2012, 5 pages.
Final Office Action for U.S. Appl. No. 13/041,805 mailed on Mar. 1, 2013, 10 pages.
Final Office Action for U.S. Appl. No. 13/041,769 mailed on Mar. 5, 2013, 23 pages.
English translation and Notification of the First Office Action for corresponding Chinese Patent Application No. 2012100569418 dated Jun. 17, 2014, 22 pages.
Notice of Allowance for U.S. Appl. No. 13/041,805 mailed on Jun. 11, 2014, 7 pages.
English translation and Notification of the First Office Action for corresponding Chinese Patent Application No. 201210055091X dated Jan. 15, 2014, 16 pages.
Office Action in related Japanese Patent Application No. 2013-194546 dated Sep. 2, 2014, 2 pages.
Non-Final Office Action for U.S. Appl. No. 13/041,910 mailed on Aug. 25, 2014, 20 pages.
Notice of Allowance for U.S. Appl. No. 13/041,769 mailed on Sep. 12, 2014, 2 pages.
Extended European Search Report for corresponding European Application No. 12156239.1 dated Apr. 15, 2014, 7 pages.
Final Office Action for U.S. Appl. No. 13/041,792 mailed on May 14, 2014, 25 pages.
English Translation and Second Office Action for corresponding Japanese Patent Application No. 2012101355153 dated Feb. 13, 2015, 32 pages.
Notice of Allowance for U.S. Appl. No. 13/041,910 mailed on Mar. 16, 2015, 8 pages.
Non-Final Office Action for U.S. Appl. No. 13/102,963 mailed on Mar. 27, 2015, 9 pages.

* cited by examiner

PROVIDING POSITION INFORMATION IN A COLLABORATIVE ENVIRONMENT

BACKGROUND

Embodiments of the present invention relate to systems that can be used collaboratively, and more particularly to techniques for providing positional information with respect to these systems to enhance the collaborative efforts performed using such systems.

An Interactive Whiteboard (IWB) system (also referred to as an electronic whiteboard system) offers several advantages over traditional chalk and board systems. In an IWB system, a user's writings are converted to digital information (also referred to as digital representation of the writing), which is then projected and displayed on a display surface (like a whiteboard) of the IWB system. Multiple such IWB systems may be communicatively coupled via a communication network (such as the Internet) and participate in a collaborative session. For example, a first IWB system and a second IWB system situated remotely from the first IWB system may be involved in a collaborative session such that information written by a first user at the first IWB system is converted to a digital representation or digital information and the digital information is projected on a display surface of the first IWB system and also on a display surface of the second IWB system. Likewise, information written by a second user at the second IWB system may be converted to digital information and the digital information projected on the surfaces of both the first and the second IWB systems. This establishes a collaborative environment for the users of the IWB systems.

Remote interaction using distributed IWB systems is however quite complicated. For example, a user at the first IWB system typically has no idea of where the user at the second IWB system is going to write and vice versa. This often causes "collisions" in the information written on the interactive whiteboards. Merely capturing a video at the first IWB system and communicating it to the second IWB system is not sufficient since a user at the first IWB system may obstruct or obscure the information displayed on the whiteboard of the first IWB system.

BRIEF SUMMARY

Embodiments of the present invention provide techniques for enhancing the experience for users participating in a collaborative session.

In one embodiment, techniques are provided wherein a first system generates an image indicative of a position of a first object with respect to a second object. The first system also generates a first signal comprising the image and digital information corresponding to written information captured at the first system. The first signal is then communicated from the first system to a second system for enabling display of the digital information and the image at the second system.

In one embodiment, the first system may generate a second signal comprising the image, generate a third signal comprising digital information, and generate the first signal based upon the second signal and the third signal.

In one embodiment, the generated image is such that when a portion of the image, when displayed at the second system, overlaps with a portion of the displayed digital information, both the portion of the displayed image and the portion of the displayed digital information are visible.

In one embodiment, the first signal comprising the digital information and the image may be output or displayed at the second system. This displaying may comprise causing the first signal to be projected onto a surface of the second system, and displaying the generated image and the digital information such that a portion of the image overlaps with a portion of the displayed digital information, and both the portion of the image and the portion of the digital information are visible.

In one embodiment, the first system may receive sensor data captured by one or more sensors, the sensor data representing the position of the first object. The first system may then generate the image based upon the sensor data.

In one embodiment, the sensor data comprises at least one of data received from a pressure sensor, data received from a motion sensor, depth information received from a camera, autofocus information received from a camera, data received from a proximity sensor, or data received from an audio recording device.

In one embodiment, the second object is a component of the first system, wherein the component is used for inputting the written information, and the first object is a user using the first system. In an embodiment, the image that is generated is a silhouette of a portion of the user.

According to another embodiment, techniques are provided for receiving, by a first system, a signal comprising an image and digital information, wherein the digital information is a digital representation of information captured at a second system remotely located from the first system, and wherein the image is indicative of a position of a first object with respect to a second object. The first system may display the signal received from the second system, wherein the displaying comprises displaying the image and the digital information such that a portion of the image overlaps with a portion of the displayed digital information, and both the portion of the image and the portion of the digital information are visible.

In one embodiment, the displaying comprises causing the signal to be output on a surface of the first system. The first object may be a user of the second system and the second object may be a component of the second system. The digital information is a digital representation of writing information captured at the second system.

In one embodiment, the image is a silhouette of the user.

In one embodiment, for multiple IWB systems participating in a collaborative session, the position of an object at a first IWB system is tracked. This positional information is then communicated to and displayed at other IWB systems participating in the collaborative session, thus providing a hint to the users of the other IWB systems of the position of the user at the first IWB system.

In one embodiment, the position of a user or other object at a first IWB system may be tracked. For example, the position of the user with respect to a display surface of the first IWB system may be tracked. Information (e.g., in the form of an image) may then be displayed at a second IWB system located remotely from the first IWB system and participating in a collaborative session with the first IWB system in a manner that provides an indication to users of the second IWB system of the physical position of the user at the first IWB system.

In one embodiment, the position information may be an image that is projected on to a display surface of the second IWB system. The image may be displayed in a manner such that any other information displayed on the display surface of the second IWB system is visible even if the displayed image overlaps with the other displayed information. In this manner, the image indicative of the position does not obscure any other information displayed on the display surface of the second IWB system.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Figure 1:
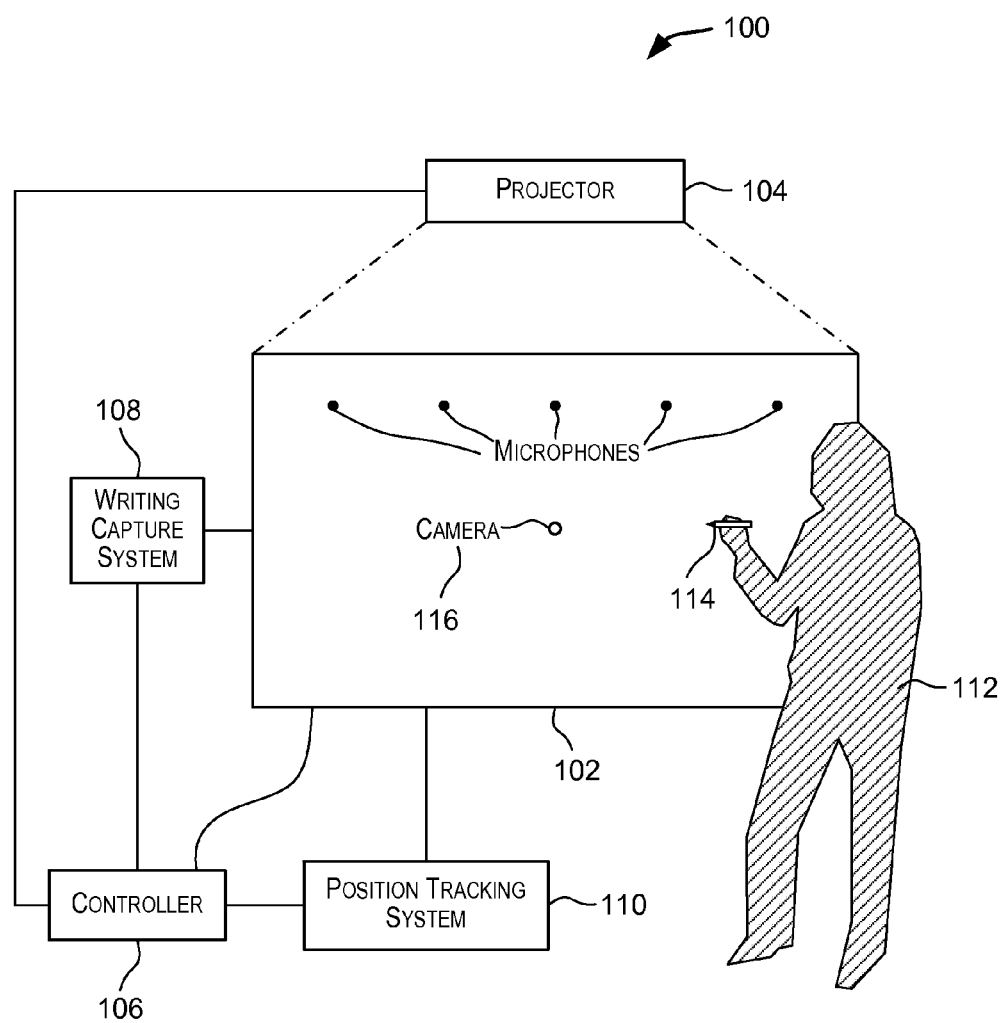
FIG. 1 is a simplified block diagram of an Interactive Whiteboard (IWB) system that may incorporate an embodiment of the present invention.

FIG. 1 is a simplified block diagram of an Interactive Whiteboard (IWB) system 100 that may incorporate an embodiment of the present invention. IWB system 100 may comprise several components including a display surface 102, a projector 104, a controller 106, a writing capture system 108, and a position tracking system 110. The components of system 100 depicted in FIG. 1 are meant for illustrative purposes only and are not intended to limit the scope of invention embodiments in any manner. Alternative embodiments may have more or fewer components than those shown in FIG. 1.

Display surface 102 (also sometimes referred to as the "whiteboard" or "drawing surface" of the IWB system) provides both an input and an output interface for users of IWB system 100. As an input interface, it enables a user to provide writing (also referred to as drawing) input, which is then converted to digital information. As an output interface, digital information may be projected on surface 102 by projector 104 such that the projected information can be viewed by one or more users of IWB system 100. One or more users of IWB system 100 may provide input to IWB system 100 by writing using one or more writing instruments. For example, as shown in FIG. 1, a user 112 may write on surface 102 using writing instrument 114. The term writing or drawing or writing information, as used in this application, may include one or more characters, letters, symbols, words, sentences, tables, drawings, sketches, figures, or any other type of input that can be provided using writing instrument 114. As another example, a writing or drawing can include hand-written letters, numbers, or symbols, expressed in any language or format. As yet another example, a writing or drawing can comprise a combination of hand-drawn pictorial and textual elements.

The user's writings made using the writing instrument are captured by writing capture system 108 and communicated to controller 106, which determines digital information corresponding to the writings. The digital information may then be communicated to projector 104 for projection on to surface 102. The digital information may be in various forms such as a time-ordered series of strokes, a pixel-based image, plain or formatted text, and the like.

A user of IWB system 100 may use various different writing instruments to write or provide input. In one embodiment, the writing instrument may be a physical object that may or may not leave a visible mark on surface 102. For example, a user may use his finger as a writing instrument to write on surface 102. Even though the finger may not leave any visible mark on surface 102, the finger's movements are captured and then translated to digital information, which may then be projected on surface 102. As another example, the user may use a pointer or a stylus as a writing instrument to write on surface 102, where the stylus may not leave any physical visible mark on surface 102. In other embodiments, a user may also use a writing instrument that leaves a visible mark on surface 102. For example, a user may use a pen or a regular dry erase marker to write on surface 102. The user's writings are captured, digital information corresponding to the writings determined, and the digital information then projected on surface 102.

In one set of embodiments, in addition to writing, a writing instrument 114 may also be used to interact in other ways with IWB system 100. For example, in one embodiment, writing instrument 114 may be used to erase previously written information.

Surface 102 may be a passive or active surface. In one embodiment, surface 102 may be a passive surface that simply accepts marks from a pen than can be identified by an external sensor like a camera. For example, display surface 102 may be a plain old opaque whiteboard. In another embodiment, surface 102 may be an active surface like a surface containing a sensor, for example from Wacom Co., Ltd in Japan. Such sensors contain an antenna and interact with radio frequency identification (RFID) pens containing a passive coil. By activating the antenna in a specific way, the pen can be triggered and the antenna can measure the pen's response to the antenna and identify the pen's location and orientation. Other active surfaces include resistive touch systems which measure a change in resistance to identify the location of an object pressing against the screen. Other examples of active surfaces include glass boards surrounded with infrared LEDs which use "frustrated total internal reflection" (FTIR) to allow a camera to capture the location of a finger or pen on the surface or a capacitive touch screen like those found on iPad and iPhone devices from Apple, Inc. in Cupertino, Calif.

Writing capture system 108 is configured to capture the writings made by a user using writing instrument 114. The writing information captured by writing capture system 108 may then be communicated to controller 106 for further processing. Writing capture system 108 may comprise one or more components that enable the writings made using writing instrument 114 to be captured. For example, in an embodiment where a writing instrument that leaves a visible mark on surface 102 is used, writing capture system 108 may comprise a camera that is positioned in front of surface 102 and configured to capture images of surface 102, where the captured images include the visible marks made on surface 102 using writing instrument 114. The captured images may then be communicated to controller 106, which is configured to process the images to determine digital information corresponding to the visible marks made on surface 102.

In another embodiment, writing capture system 108 may comprise one or more sensors that are configured to capture the motion or movement of the writing instrument when the user uses the writing instrument to write. The motion may be captured using different techniques. According to one technique, motion sensors may be placed along surface 102 that are capable of capturing the motion of the writing instrument in a 2-dimensional plane (or in three dimensions). The captured motion information may then be conveyed to controller 106, which may process the captured information to determine the user's writings and determine digital information corresponding to the writings.

In yet another embodiment, writing capture system 108 may comprise one or more pressure sensors that may be incorporated into surface 102 making surface 102 pressure sensitive. Such a pressure mapping multi-touch surface can be built from force sensitive resistor material sandwiched between a flexible electronic circuit like those available from TekScan, Inc. in South Boston, Mass. In such an embodiment, surface 102 may provide a multi-touch pressure sensing surface that can capture writing information based upon a user's touches on surface 102. The information captured by the pressure sensors may then be communicated to controller 106 for further processing. In one embodiment, in addition to sensing a user's writing, the pressure sensors may also be able to determine the force with which a user writes on surface 102. This force information may also be communicated to controller 106 for further processing and analysis.

In yet another embodiment, surface 102 may be a capacitively-coupled input interface such as a surface found on an Apple iPad™ or iPhone™ device. In such an embodiment, surface 102 may enable a multi-touch input experience, zooming and panning capabilities, and the like. In such an embodiment, a user may use a finger or a conductive stylus to write on surface 102 and the writings may then be communicated to controller 106 for processing and analysis.

In order to be able to capture the writings made using writing instrument 114, in one embodiment, writing capture system 108 may be communicatively linked with writing instrument 114. This link, which may be wired or wireless, enables writing capture system 108 to capture the writings made using the writing instrument.

Controller 106 acts as a central component for performing processing that controls and enables the various functions provided by IWB system 100. Controller 106 may be operatively coupled to one or more other components of IWB system 100 and configured to control and/or coordinate the functions performed by these components. For example, controller 106 may be operatively coupled to writing capture system 108 and/or to display surface 102 and configured to receive information captured by writing capture system 108. The information received by controller 106 from writing capture system 108 may be in various different formats such as pressure information, motion information, strokes information, and the like. Controller 106 is configured to process the received information and determine digital information corresponding to the received information. The determined digital information may then be communicated to projector 104 so that it can be projected on surface 102.

Figure 5:
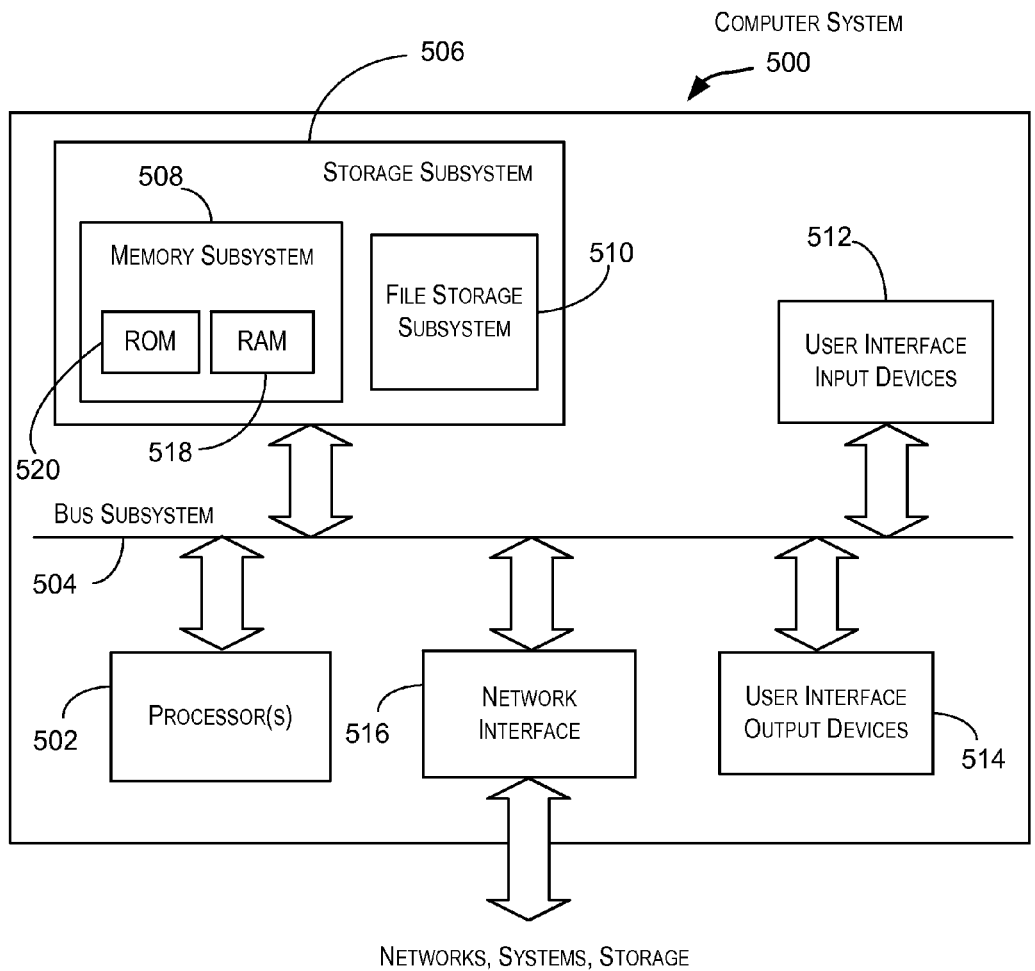
FIG. 5 is a simplified block diagram of a computer system that may be used to practice an embodiment of the present invention.

Controller 106 is typically a processor-based computing device. An example of controller 106 is depicted in FIG. 5 and described below. In alternate embodiments, controller 106 may be a processor, a programmable logic device, and the like. Controller 106 may execute one or more programs (code instructions), which when executed by a processor of controller 106, enable the processing performed by controller 106.

As described above, controller 106 is configured to determine digital information corresponding to information input using a writing instrument. In one embodiment, as part of this processing, controller 106 may be configured to determine strokes information based upon the information received from writing capture system 108 and then determine digital information corresponding to the strokes information. The strokes information may comprise information related to a collection of time-ordered strokes. In one embodiment, a stroke may correspond to data produced by a writing instrument from the time the writing instrument is engaged until the writing instrument is disengaged. For example, in one embodiment, a stroke may correspond to data produced by a writing instrument from the time the writing instrument makes contact with surface 102 until the contact is interrupted or broken. A stroke may be considered the most fundamental unit used for representing information input by a user using a writing instrument. Each stroke has an associated time component indicative of when the stroke was made. The information input or written by a user using writing instrument 114 may be represented by a series or set of time-ordered strokes. Controller 106 may then determine digital information corresponding to the strokes information.

In an alternative embodiment, writing capture system 108 may itself be able to determine strokes information and communicate the strokes information to controller 106. Controller 106 may then determine digital information directly from the information received from writing capture system 108.

Accordingly, controller 106 may receive raw sensor data captured by writing capture system 108 and then determine strokes information based upon the raw data or alternatively, may receive strokes information from writing capture system 108. Controller 106 may then determine digital information corresponding to the strokes information. In some embodiments, the digital information may be determined directly from the raw sensor data. The digital information determined by controller 106 is such that it reflects the writings made using writing instrument 114. For example, if the user writes a "W" on surface 102 using writing instrument 114 then the digital information determined by controller 106 may be a digital representation of "W". Controller 106 may then communicate the determined digital information to projector 104 for projection on surface 102.

Projector 104 is configured to project and display information received from controller 106 on display surface 102. In one embodiment, projector 104 receives a signal (e.g., a video signal) from controller 106 where the signal comprises digital information determined by controller 106 corresponding to writings made using a writing instrument. Projector 104 is configured to project or output the received signal on to surface 102 such that the digital information corresponding to the writings is output or displayed on surface 102 and made viewable to one or more users of IWB system 100. In one embodiment, the digital information corresponding to a writing is projected on to surface 102 in such a manner that the digital information is projected in the same location as the writing on surface 102. For example, if a user uses a writing instrument to write a "W" on surface 102, the digital information (e.g., the digital "W") is projected on to the same location of surface 102 where the user wrote the "W".

In one embodiment, projector 104 is a short throw projector that is positioned at a short distance in front of surface 102 such that it can project the digital information on to surface 102. For example, projector 104 may be an ultra short throw projector that is positioned in front of surface 102 and projects the information received from controller 106 on to surface 102. An example of such a projector is the CP-AW250NM produced by Hitachi, Ltd. Other types of front throw projectors may be used in alternative embodiments. Projector 104 may project in different resolutions including high definition (e.g., 1920×1080) resolutions.

IWB system 100 may also comprise one or more devices for capturing other types of information such as audio, video, image, and/or other types of information. The information captured by these devices may be communicated to controller 106. Controller 106 may use this information to perform various types of processing. For example, in one embodiment, controller 106 may be configured to correlate the information captured using these devices with the digital information determined by controller 106 based upon the temporal attributes of the captured information and the digital information.

For example, the capture devices may include one or more audio recording devices that are configured to capture audio information. According to one use case, IWB system 100 may be used in a corporate meeting setting and the microphones may capture audio information spoken by the meeting attendees. The captured audio information may be captured by the microphones and correlated to the writing information. As shown in FIG. 1, in one embodiment, the microphones may be embedded in surface 102 to optimize the audio capture process. In alternative embodiments, the microphones may be separate from surface 102. The captured audio information may be communicated to controller 106 for processing and analysis.

IWB system 100 may also comprise one or more devices for capturing video and/or image information. These devices may include for example one or more cameras that are capable of capturing image or video information. In one embodiment, the cameras may be positioned so as to capture images or videos of users of IWB system 100. For example, as shown in the embodiment depicted in FIG. 1, a camera may be associated with surface 102 such that images of one or more users positioned nearby or in front of surface 102 can be captured. The captured video/image information may be communicated to controller 106 for processing and analysis.

In one embodiment, IWB system 100 comprises a position tracking system 110 that is configured to sense and track the position of an object with respect to a component of IWB system 100. For example, in one embodiment, position tracking system 110 may be configured to track the position of a user of IWB system 100 with respect to surface 102. For purposes of describing the workings of position tracking system 110 it is assumed that the object whose position is sensed and tracked is a user of IWB system 100. This is however not intended to limit the scope of embodiments of the present invention. In alternative embodiments, the positions of one or more other types of objects may also be tracked using position tracking system 110.

Position tracking system 110 may comprise one or more sensors and/or devices that can dynamically sense and track the position or location of an object with respect to surface 102. Additionally, the sensors may be able to capture information regarding the shape and/or size of the object being tracked. The sensor data captured by position tracking system 110 is communicated to controller 106. Further details related to processing performed by controller 106 based upon the sensor data is described below.

In one embodiment, the sensors of position tracking system 110 may define a space ("tracking zone") around display surface 102 of the IWB system, and track the shape/size and positions of one or more objects in the tracking zone. For example, the position of any user within the tracking zone may be tracked with respect to surface 102. In one embodiment, the position tracking system sensors may be placed such that a user who is writing on surface 102 or is positioned proximal to surface 102 is tracked. One or more users within the tracking zone may be sensed and tracked. In one embodiment, the dimensions of the tracking zone may be user configurable.

Position tracking system 110 may comprise various different types of sensors that can track the physical location and shape/size of a user within the tracking zone. In one embodiment, one or more depth sensors (e.g., depth sensors provided by PrimeSense™ Ltd.) may be used to track the physical location and shape/size of a user. In one embodiment, the sensors may be positioned on surface 102 such that the position of a user proximal to surface 102 can be tracked.

In another embodiment, position tracking system 110 may comprise pressure distribution sensors in the form of force sensitive resistance grids like those available from TekScan, Inc. in South Boston, Mass. The pressure distribution sensors may be placed in an area on the ground in front of and proximal to surface 102 such that the position of a user's feet standing at surface 102 can be measured and the person's position tracked.

In yet another embodiment, position tracking system 110 may comprise one or more cameras that are placed in front of and facing surface 102. Each camera may be configured to takes images of surface 102 including images of objects positioned between surface 102 and the camera. The position of such objects may then be determined from the images. In one embodiment, a depth camera may be used (e.g., depth cameras from PrimeSense™ Ltd.). In yet another embodiment, a device such as the Microsoft Kinect™ device may be used to sense the physical position and/or shape/size of a user with respect to surface 102. In one embodiment, stereo cameras, such as those from Point Grey Research like the Bumblebee 2, may be used to capture a user's location from 2 points of view in order to identify the user's position in 3 dimensions. In one embodiment, a video camera facing the display surface or whiteboard can be used. The video stream from the camera can be enhanced using software image processing to increase the contrast in order to create a silhouette image of the user. Various other sensors may be used in alternative embodiments.

In another embodiment, camera 116 positioned on display surface 102 may be used to determine the user's position with respect to surface 102. Camera 116 may be configured to point at and autofocus on user 112. As the position of user 112 changes with respect to display surface 102, the autofocus distance of camera 116 also changes to maintain focus on the user. The camera's autofocus can then be used to determine the position of user 112 with respect to display surface 102.

In one embodiment, one or more proximity sensors may be used to determine user 112's distance from display surface 102. One or more of these proximity sensors may operate on reflected ultrasonic pulses of infrared (IR) pulses to gauge distance. The output of these sensors may be forwarded to controller 106 for further processing.

In another embodiment, sound localization techniques may be used to determine the position of a user with respect to a drawing surface. For example, microphones positioned along the drawing surface may be used to capture audio information spoken by a user and the captured audio information may then be processed using sound localization techniques to determine a position of the user with respect to the drawing surface.

The information sensed by position tracking system 110 may be communicated to controller 106 for further processing. The information may be communicated using wired or wireless links. Details related to the processing of the sensor stream performed by controller 106 are provided below.

As described above, in an IWB system, a user's writings are converted to digital information, which is then projected and displayed on a surface of IWB system 100. Converting the "written" information to digital information enables several operations, which can be performed on electronic information, to be now performed on information written on a whiteboard. The true power of such a system is realized when used in a collaborative setting. For example, two or more IWB systems may be internetworked via a communication network (such as the Internet) and be used in a collaborative manner.

Figure 2:
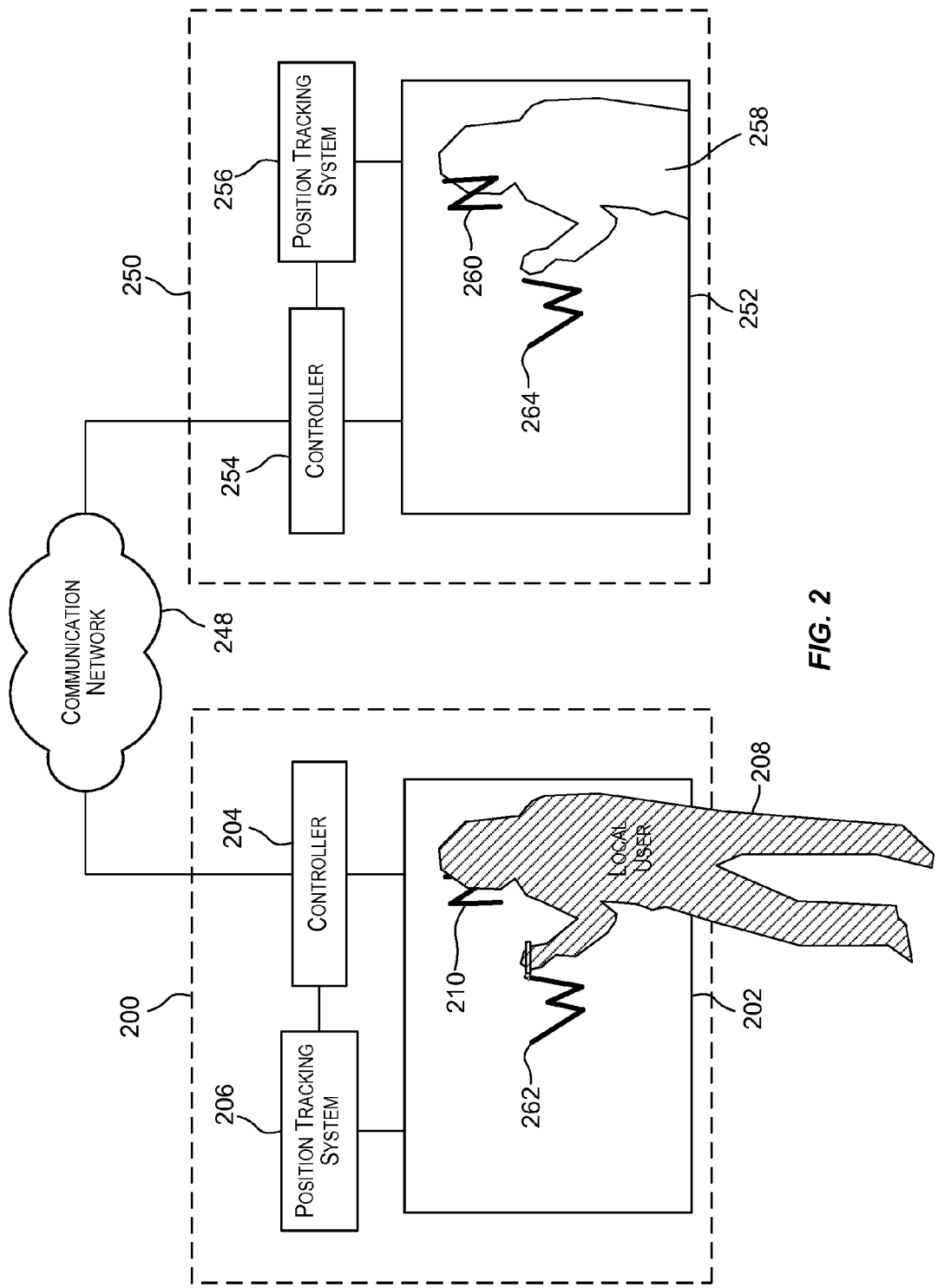
FIG. 2 is a simplified block diagram of a network environment in which multiple IWB systems are networked via a communication network and participate in a collaborative session according to an embodiment of the present invention.

FIG. 2 is a simplified block diagram of a network environment in which multiple IWB systems are networked via a communication network and participate in a collaborative session according to an embodiment of the present invention. As shown in FIG. 2, an IWB system 200 is communicatively coupled with another remotely located IWB system 250 via communication network 248. IWB system 200 and IWB system 250 can each be substantially similar in configuration to IWB system 100 depicted in FIG. 1

Communication network 248 may be a single communication network or a collection of communication networks. The networks may include the Internet, an intranet, a local area network (LAN), a wide area network (WAN), a wireless network, a private network, a public network, a switched network, or any other suitable communication network that enables communications between IWB system 200 and IWB system 250. One or more different communication protocols (e.g., Ethernet, various wireless protocols) may be used to facilitate communications between IWB system 200 and IWB system 250 using communication network 248.

In one embodiment, the controller of each IWB system may provide an interface to communication network 248. For example, in FIG. 2, controller 204 may provide a network interface coupling IWB system 200 to communication network 248 while controller 254 may provide a network interface coupling IWB system 250 to network 248. An IWB system may be connected to communication network 248 via wired or wireless links.

Multiple IWB systems may be involved in a collaborative session. During such a collaborative session, the IWB systems communicate information with each other such that any information written by a user at one of the IWB systems is projected and displayed on the display surfaces of the other IWB systems participating in the session. The information written at an IWB system may also be projected and displayed on the display surface of that IWB system. In this manner, the information written on the surface of one IWB system is also displayed on surfaces of the other remote IWB systems involved in the session. This enables remotely located IWB systems to be used collaboratively wherein remotely located users can interact as if writing on the same whiteboard.

For example, in FIG. 2, IWB system 200 may be involved in a collaborative session with IWB system 250, which is remotely located from IWB system 200. A user 208 local to IWB system 200 may use a writing instrument to write on surface 202 of IWB system 200. The writing is captured by a writing capture system of IWB system 200 and controller 204 may then determine the digital information corresponding to the written information. The digital information determined by controller 204 may then be displayed on surface 202 of IWB system 200. Controller 204 may also communicate the digital information to the IWB system 250 where it is projected and displayed on display surface 252. In this manner, information written by user 208 on surface 202 is displayed and can be viewed by both users of IWB system 200 and IWB system 250. For example, in FIG. 2, the letter "W" 262 written by user 208 at IWB system 200 is projected on surface 202 and also on surface 252 as "W" 264, thereby enabling users of both IWB systems to view the information. In a similar manner, for any information written on surface 252 of IWB system 250, controller 254 is configured to determine digital information corresponding to the written information and cause the determined digital information to be projected and displayed on surface 252 of IWB system 250 (e.g., "N" 260) and also on surface 202 of IWB system 200 (e.g., "N" 210). For example, in FIG. 2, the letter "N" written by user (not shown) at IWB system 250 is projected onto surface 252 (as "N" 260) and also on surface 202 (as "N" 210), thereby enabling users of both IWB systems to view the information. The manner in which the information is projected at both the IWB systems gives the feel that users of IWB system 200 and IWB system 250 are writing on the same display surface or whiteboard in a collaborative environment.

Although only two IWB systems are shown in FIG. 2, this is not intended to limit the scope of embodiments of the present invention. Any number of IWB systems may be involved in a collaborative session. It is also possible for an IWB system to be simultaneously involved in multiple separate collaborative sessions. For example, in FIG. 2, IWB system 200 is involved in a collaborative session with IWB system 250. Simultaneous with this session, IWB system 200 may also be involved in a separate collaborative session with a third IWB system (not shown), where IWB system 250 is not a participant in that separate session.

There are various ways in which an IWB system may receive information captured at one or more remote IWB systems. In one embodiment, IWB system 200 may be connected to IWB system 250 over a LAN or WAN using a shared messaging service that complies with the Java Message Server (JMS) specification. Each stroke captured from either the remote or local IWB system can be published to the same channel or "topic" at the JMS and all connected devices subscribed to that topic receive the messages. In this manner, any stroke published to the channel is received by all IWB systems. One skilled in the art will recognize that there are many systems for sharing information over a LAN or WAN and many means for doing so.

An IWB system participating in a collaborative session may comprise a position tracking system that is configured to track the position and/or shape/size of an object with respect to a component (e.g., with respect to the display surface) of that IWB system. For example, in FIG. 2, position tracking system 206 of IWB system 200 may be configured to track the position and/or shape/size of an object, such as user 208, with respect to surface 202. According to an embodiment of the present invention, based upon the information sensed and tracked by position tracking system 206, information ("position information") is displayed at remote IWB system 250 that is indicative of the position and/or shape/size of user 208 with respect to surface 202. This displayed information enables a user of IWB system 250 to get an idea of the position of user 208 with surface 202 of IWB system 200, which is located remotely from IWB system 250.

Different techniques may be used to display the position information at IWB system 250. In one embodiment, an image 258 (referred to as "position image") is generated based upon the information sensed and tracked by position tracking system 206. The image 258 is then projected on to surface 252 of IWB system 250. The image 258 conveys to a user of IWB system 250 the position of user 208 with respect to surface 202 of IWB system 200. Image 258 may also convey the shape or size of user 208 from the perspective of surface 202. In the embodiment depicted in FIG. 2, image 258 is a silhouette of user 208. Silhouette 258 is indicative of the position of user 208 with respect to surface 202 of IWB system 200. The outline of silhouette 258 also indicates the shape/size of user 258 from the perspective of surface 202.

According to an embodiment of the present invention, image 258 is displayed on surface 252 of IWB system 250 in such a way that information, either written or displayed on surface 252, is still visible to users of IWB system 250, even when image 258 overlaps with the written or displayed information. For example, in FIG. 2, a letter "N" 210 is displayed on surface 202 (the letter is obstructed by user 208 standing in front of surface 202) and also on surface 252 (reference 260). As can be seen, even though image 258 and letter "N" 260 overlap in position, the transparency of image 258 is such that letter "N" 260 is clearly visible and can be viewed by users of IWB system 250 along with image 258. Accordingly, the image 258 is displayed at IWB system 250 in such a manner that it not only indicates the position and/or shape/size of user 208 (or any other object) with respect to surface 202 of remotely located IWB system 200 but does so in such a manner that the information written or displayed on surface 252 of IWB system 250 is still visible and not obstructed by image 258. Although not shown in FIG. 2, the position of an object with respect to surface 252 and as tracked by position tracking system 256 of IWB system 250 may be projected and displayed on surface 202 of IWB system 200.

Image 258 displayed on system surface 252 enables a user of IWB system 250 to get a hint or idea of the position and/or shape/size of user 208 at remotely located IWB system 200 with respect to surface 202. Knowing this information enhances the experience of the collaborative session in various ways. For example, a user of IWB system 250 may use this information to determine which side of surface 252 to write on so that his/her writings do not collide with writings of user 208. For example, in FIG. 2, based upon displayed image 258, a user of IWB system 250 knows that user 208 at IWB system 200 is positioned towards the right side of surface 202. Based upon this information, the user of IWB system 250 may position himself/herself more towards the left side of surface 252 such that something written by the user at IWB system 250 does not collide with writings of user 208.

Information regarding the position of user 208 as reflected by image 258 may also be used for various other applications. For example, in one application, the position information may be used to segment the area of surfaces 202 and 252 for use by separate individuals, possibly located remotely from each other.

As previously described, a position tracking system at an IWB system can track the physical locations and/or shape/size of one or more users situated within the tracking zone of the position tracking system. An image, like image 258 depicted in FIG. 2, may be displayed for each tracked user. For example, if multiple users are present within the tracking zone around surface 202, multiple images representing the positions of the multiple users may be displayed on surface 252.

In the embodiment depicted in FIG. 2 and described above, the position information is displayed using an image representing the silhouette of the user (or any object) being tracked. Displaying the position information as a silhouette not only depicts the physical position of a user at the remote IWB system but also depicts the shape/size of the user. The silhouette also indicates the activity and/or attitude of the tracked user. For example, a silhouette provides information such as if the user is about to write on surface 202, if the user is about to walk away from surface 202, if the user at IWB system 200 is in deep thought and scratching his head, etc. However, the use of a silhouette is not intended to limit the scope of embodiments of the present invention. Other types of images comprising symbols, letters, signs, geometric shapes, etc. may also be used to represent the position information in alternative embodiments. These images may be used to convey the location of a user with respect to a display surface of an IWB system.

Figure 3:
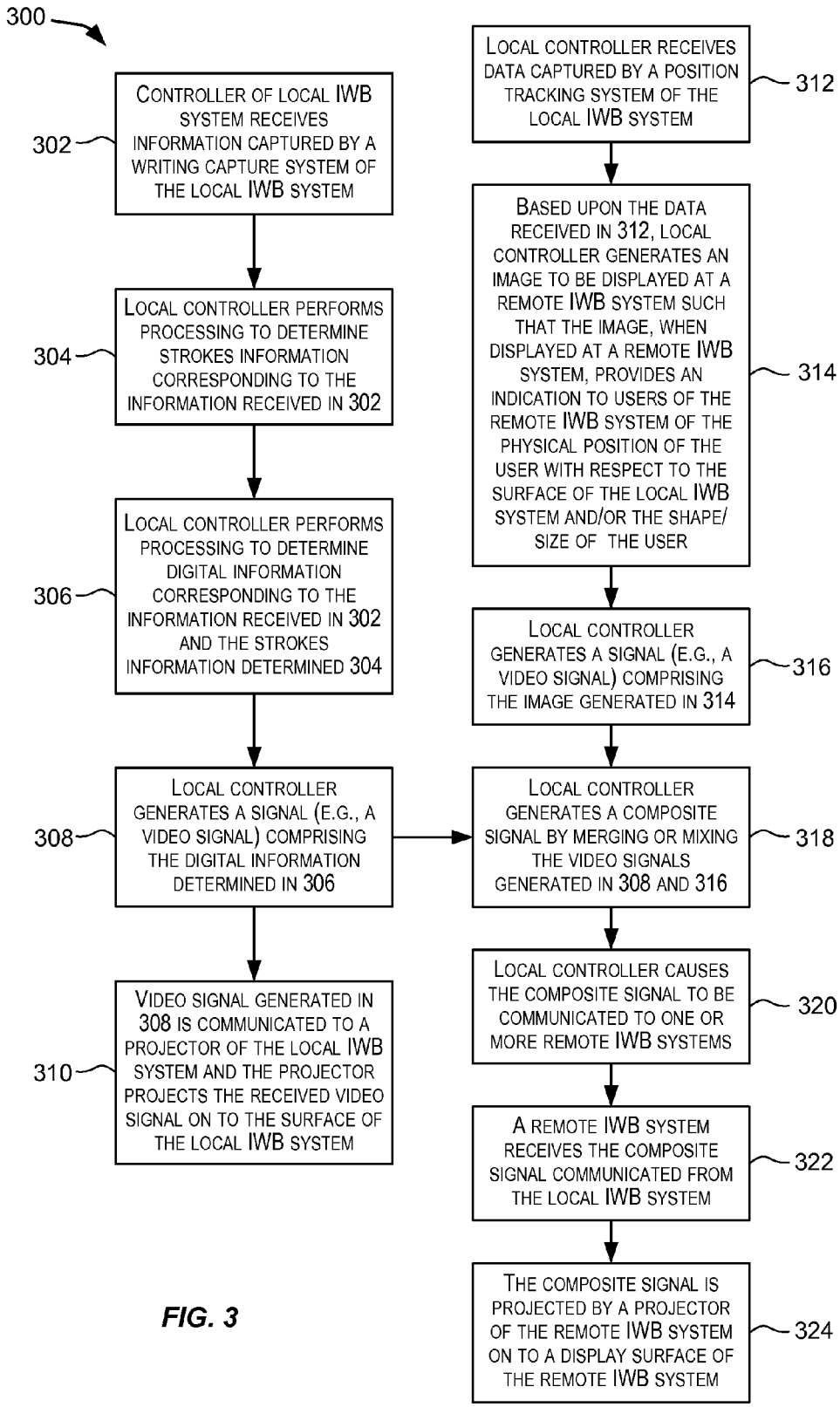
FIG. 3 depicts a simplified flowchart depicting processing performed by IWB systems participating in a collaborative session according to an embodiment of the present invention.

FIG. 3 depicts a simplified flowchart 300 depicting processing performed by IWB systems participating in a collaborative session according to an embodiment of the present invention. The processing depicted in FIG. 3 may be performed by one or more components of the IWB systems such as by controllers of the IWB systems. The processing may be performed using software (e.g., code, instructions, program) executed by a processor of the controller, hardware of the controller, or combinations thereof. In one embodiment, the software executed by a controller may be stored on a non-transitory computer-readable storage medium.

For purposes of the flowchart depicted in FIG. 3, it is assumed that multiple IWB systems are participating in an interactive collaborative session. The participating systems include a "local" IWB system and one or more other IWB systems that are remotely located from the local IWB system and referred to as "remote" IWB systems. For example, the local IWB system may be IWB system 200 depicted in FIG. 2 and a remote IWB system may be IWB system 250 depicted in FIG. 2. In one embodiment, steps 302, 304, 306, 308, 310, 312, 314, 316, 318, and 320 may be performed by a controller of the local IWB system, while steps 322 and 324 may be performed by a remote IWB system participating in the collaborative session.

The steps depicted in FIG. 3 or the particular series of processing steps depicted in FIG. 3 are not intended to limit the scope of embodiments of the present invention. Other or different processing steps may be performed in alternative embodiments. One or more of steps depicted in FIG. 3 may be performed in parallel or may be performed in a serial manner.

As shown in FIG. 3, a controller of the local IWB system may receive information captured by a writing capture system of the local IWB system (step 302). The local controller (i.e., the controller of the local IWB system) may then perform processing to determine strokes information corresponding to the information received in 302 (step 304). As previously described, the strokes information may comprise a sequence of time-ordered strokes that represent the information written by a user of the local IWB system. In one embodiment, the information received in 302 may itself comprise strokes information, in which the processing in step 304 may not be performed.

The local controller then performs processing to determine digital information corresponding to the information received in 302 and the strokes information determined in 304 (step 306). In one embodiment, the digital information determined by controller 204 reflects the writings made on the surface of the local IWB system. For example, if the user writes a "W" on the surface of the local IWB system then the digital representation of "W" is determined in 306. The digital information may be in a form that is displayable at a remote IWB system.

The processing performed in 306 may also include determining a location where the determined digital information is to be displayed on a surface of a remote IWB system. For example, in one embodiment, the location of the digital information is determined such that the digital information is projected in the same location of the local surface where information was written by the user. For example, if a user uses a writing instrument to write a "W" on surface 202, the location of the digital information (e.g., the digital "W") is determined such that the digital information representation of the "W" is projected on the same location as where the user wrote the "W" but at a remote IWB system.

The local controller then generates a signal (e.g., a video signal) comprising the digital information determined in 306 (step 308). Various different formats may be used to generate the video signal. In one embodiment, the video signal generated in 308 may be communicated to a projector of the local IWB system and the projector may project the video signal on to the surface of the local IWB system (step 310) such that the digital information is viewable by users of the local IWB system. In this manner, the information written by a user of the local IWB system is converted to digital information and output on the surface of the local IWB system.

The local controller may also receive data captured by a position tracking system of the local IWB system (step 312). The data received in 312 may provide information indicative of the physical location of a user with respect to the surface of the local IWB system. The data received in 312 may also include data representative of the shape/size and position of the local user. The data received in 312 may be in various forms such as depth information from one or more depth sensors, video signals received from one or more depth cameras, autofocus information from a camera, pressure and position information from pressure sensors and force sensitive resistance grids, data from proximity sensors, data received from an audio recording device, data from a motion sensor, and the like.

Based upon the data received in 312, the local controller generates an image to be displayed at a remote IWB system such that the image provides an indication to users of the remote IWB system of the physical position of the user with respect to the surface of the local IWB system and/or the shape/size of the user (step 314). If the image to be displayed is a silhouette, then as part of 314, the local controller generates an outline of the silhouette based upon the data received in 312. As part of 314, the local controller may also determine the position where the image is to be displayed at the remote IWB system. In alternative embodiments, other types of images used to represent the position of the local user may be generated and their respective positions determined.

The local controller then generates a signal (e.g., a video signal) comprising the image and related information generated in 314 (step 316). The local controller then generates a composite signal by merging or mixing the video signals generated in 308 and 316 (step 318). The composite video signal encodes both the digital information determined in 306 and the image and related information generated in 314. The local controller may then cause the composite signal to be communicated to one or more remote IWB systems participating in the collaborative session (step 320).

A remote IWB system participating in the collaborative session may receive the composite signal communicated from the local IWB system (step 322). In one embodiment, the composite signal may be received by a controller of the remote IWB system. The composite signal may then be communicated to a projector of the remote IWB system and the projector may then project the composite signal on to a display surface of the remote IWB system (step 324). The projector at the remote IWB system may be positioned in front of the display surface of the remote IWB system. In this manner, both the digital information determined in 306 and the image generated in 314 is displayed on the display surface of the remote IWB system. The image is displayed in a manner that any other information displayed on the surface of the remote IWB system is visible even when the position image overlaps with the other displayed or written information. For example, as depicted in FIG. 2, the letter "N" is visible even though image 258 overlaps with it.

During the collaborative session, as the position of the local user changes with respect to the local display surface, the dimensions and position of the position image that is displayed at the remote IWB system is automatically and dynamically updated such that the image displayed at the remote IWB system tracks the changing position of the user at the local IWB system. In this manner, the position image displayed at the remote IWB system is updated in real time.

Although not shown in FIG. 3, the local IWB system may also receive signals from the remote IWB systems. A signal from a remote IWB system may comprise digital information corresponding to writings made at that remote IWB system and also possibly an image representative of a position and/or shape/size of a user at the remote IWB system. The projector of the local IWB system may be configured to project the signals received from the remote IWB systems on to the surface of the local IWB system in addition to projecting the signal generated in 308. In this manner, a user at the local IWB system can also see the positions of users at the remote IWB systems.

In the embodiment depicted in FIG. 3 and described above, a composite signal is generated by the local controller and then communicated to the remote IWB systems. In an alternative embodiment, the local controller may be configured to communicate both the signal generated in 308 and the signal generated in 316 as two separate signals to a remote IWB system. The merging of the signals may then be performed at the remote IWB system. In one embodiment, the remote IWB system may not merge the signal but instead may selectively determine which of the two received signals to project on to the display surface of the remote IWB system.

As indicated above, an IWB system may simultaneously participate in multiple separate collaborative sessions. For example, a first IWB system may participate in a first collaborative session with a first set of remote IWB systems and may at the same time participate in a second collaborative session with a second set of remote IWB systems. In such a situation, the information projected on the display surface of the first IWB system may comprise two separate views, a first view corresponding to the first collaborative session and a second view corresponding to the second collaborative session.

Figure 4:
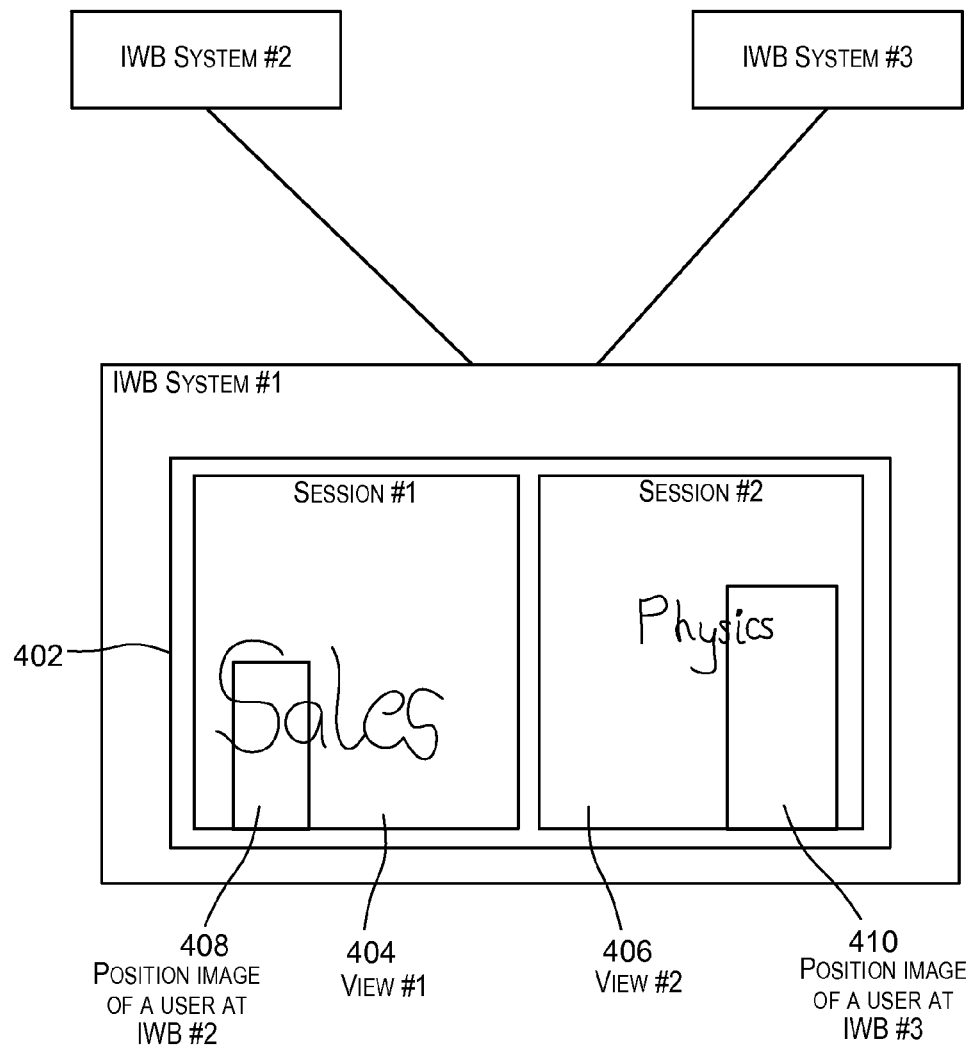
FIG. 4 depicts a simplified block diagram of an IWB system participating in two separate collaborative sessions at the same time according to an embodiment of the present invention.

FIG. 4 depicts a simplified block diagram of an IWB system participating in two separate collaborative sessions at the same time according to an embodiment of the present invention. In FIG. 4, IWB system #1 participates in a first collaborative session (Session #1) with IWB system #2 and at the same time participates in a second collaborative session (Session #2) with IWB system #3. The information projected on to a display surface 402 of IWB system #1 by a projector of IWB system #1 may comprise two views: a first view (View #1) 404 corresponding to Session #1 and a second view (View #2) 406 corresponding to Session #2. For example, Session #1 may correspond to a sales meeting while Session #2 may correspond to a Physics lecture. The sizes of the views corresponding to the different sessions may depend upon the size of surface 402 and also upon the number of views being simultaneously displayed. The size of a view may thus be scaled up or down depending on the number of views displayed.

Position images may be projected and displayed for each of the views. In FIG. 4, a position image 408 is displayed in View #1 representing the physical position of a user at IWB system #2. A position image 410 is also displayed in View #2 indicative of the physical position of a user at IWB system #3. Both images 408 and 410 may be dynamically updated as positions of the users at IWB systems #2 and #3 change. In the embodiment depicted in FIG. 4, the position images are in the form of geometrical shapes. Further, as can be seen from FIG. 4, the position images are displayed such that the information displayed for each of the sessions ("Sales" for Session #1 and "Physics" for Session #2) is visible even though the information overlaps with the position images.

In the case of multiple views being displayed on a whiteboard surface of an IWB system, a position image may be generated by the IWB system with respect to each view. For example, in the embodiment depicted in FIG. 4, IWB system #1 may generate one position image (PI #1) with respect to View #1 and another position image (PI #2) with respect to View #2. A signal comprising PI #1 may then be sent to IWB system #2 for displaying image PI #1 at IWB system #1, and another signal comprising position image PI #2 may be sent to IWB system #3 for displaying image PI #2 at IWB system #3.

Accordingly, in an embodiment where multiple views are displayed on the display surface of an IWB system (such as IWB system #1 depicted in FIG. 4) simultaneously participating in collaborative sessions with multiple IWB systems, with each view corresponding to a collaborative session, a position image based upon the position of the user at the IWB system may be generated with respect to each view. For example, if a user in FIG. 4 stands near the middle of surface 402 such that part of the user's body is positioned in front of View #1 and the other half of the user's body is positioned in front of View #2, the a first position image may be generated indicative of the user's position with respect to View #1 and communicated to IWB system #2, and a second position image may be generated indicative of the user's position with respect to View #2 and communicated to IWB system #3. If the user moves such that the user is not positioned in front of a particular view, then no position image may be generated for that particular view. For instance, if the user is standing completely in front of View #2 corresponding to Session #2 Physics, then no position image may be generated for session #1, even though the user is in front of surface 402, but not in front of View #1.

FIG. 5 is a simplified block diagram of a computer system 500 that may be used to practice an embodiment of the present invention. In one embodiment, computer system 500 may be used to implement controller 106 illustrated in FIG. 1 and described above. As shown in FIG. 5, computer system 500 includes a processor 502 that communicates with a number of peripheral subsystems via a bus subsystem 504. These peripheral subsystems may include a storage subsystem 506, comprising a memory subsystem 508 and a file storage subsystem 510, user interface input devices 512, user interface output devices 514, and a network interface subsystem 516.

Bus subsystem 504 provides a mechanism for enabling the various components and subsystems of computer system 500 to communicate with each other as intended. Although bus subsystem 504 is shown schematically as a single bus, alternative embodiments of the bus subsystem may utilize multiple busses.

Network interface subsystem 516 provides an interface to other computer systems, networks, and storage. Network interface subsystem 516 serves as an interface for receiving data from and transmitting data to other systems from computer system 500. For example, network interface subsystem 516 of an IWB system may enable a controller to communicate with other remotely located IWB systems via a communication network such as the Internet.

User interface input devices 512 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 500.

User interface output devices 514 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 provides a computer-readable storage medium for storing the basic programming and data constructs that provide the functionality of the present invention. Software (programs, code modules, instructions) that when executed by a processor provide the functionality of the present invention may be stored in storage subsystem 506. These software modules or instructions may be executed by processor(s) 502. Storage subsystem 506 may also provide a repository for storing data used in accordance with the present invention. Storage subsystem 506 may comprise memory subsystem 508 and file/disk storage subsystem 510.

Memory subsystem 508 may include a number of memories including a main random access memory (RAM) 518 for storage of instructions and data during program execution and a read only memory (ROM) 520 in which fixed instructions are stored. File storage subsystem 510 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 500 can be of various types including a personal computer, a phone, a portable computer, a workstation, a network computer, or any other data processing system. Due to the ever-changing nature of computers and networks, the description of computer system 500 depicted in FIG. 5 is intended only as a specific example for purposes of illustrating the preferred embodiment of the computer system. Many other configurations having more or fewer components than the system depicted in FIG. 5 are possible.

Although specific embodiments of the invention have been described, various modifications, alterations, alternative constructions, and equivalents are also encompassed within the scope of the invention. The teachings described above may be applied to any system comprising a processor that can be booted or rebooted.

Embodiments of the present invention are not restricted to operation within certain specific data processing environments, but are free to operate within a plurality of data processing environments. Additionally, although embodiments of the present invention have been described using a particular series of transactions and steps, these are not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A method comprising:
generating, by a first system, a first image representing a first object relative to a first writing surface based on position information indicative of a position of the first object relative to the first writing surface, the first object comprising a user using the first system, the first writing surface comprising a component of the first system used for inputting written information;
generating, by the first system, a first signal comprising the first image and first digital information corresponding to information representing drawings captured at the first system using the first writing surface, wherein a portion of the first image overlaps with a portion of the first digital information; and
communicating, by the first system, the first signal to a second system generating a display of the first image and the first digital information based on the first signal such that the portion of the first image and the portion of the first digital information that overlap with each other are both visible and distinguishable.

2. The method of claim 1 further comprising:
receiving, by the first system, a second signal comprising the first image; and
receiving, by the first system, a third signal comprising the first digital information;
wherein generating the first signal comprises generating the first signal based upon the second signal and the third signal.

3. The method of claim 1 further comprising receiving a second signal comprising second digital information corresponding to information representing drawings captured at the second system on a second writing surface of the second system and a second image representing a second object relative to the second writing surface.

4. The method of claim 3 further comprising:
causing the second signal to be projected onto the first writing surface; and
displaying the second image and the second digital information such that a second portion of the second image and a second portion of the second digital information that overlap with each other and are both visible and distinguishable.

5. The method of claim 1 wherein generating the first image comprises:
receiving, by the first system, sensor data captured by one or more sensors, the sensor data representing the position of the first object; and
generating the first image based upon the sensor data.

6. The method of claim 5 wherein the sensor data comprises at least one of data received from a pressure sensor, data received from a motion sensor, depth information received from a camera, autofocus information received from a camera, data received from a proximity sensor, or data received from an audio recording device.

7. The method of claim 1 wherein the first image comprises a silhouette of a portion of the user.

8. A method of handling information sent between a first system and a second system, the method comprising:
receiving, by the second system, a signal generated by the first system, the first signal comprising a first image representing a first object relative to a first writing surface and first digital information corresponding to information representing drawings captured at the first system using the first writing surface, the first image generated by the first system based on position information indicative of a position of the first object relative to the first writing surface and the first object comprising a user using the first system, the first writing surface comprising a component of the first system used for inputting written information, wherein a portion of the first image overlaps with a portion of the first digital information; and
generating, by the second system, a display of the first image and the first digital information based on the signal received from the first system, wherein the portion of the first image and the portion of the first digital information that overlap with each other are both visible and distinguishable.

9. The method of claim 8 wherein:
generating the display of the first image and the first digital information comprises causing the signal to be output on a writing surface of the second system.

10. The method of claim 9 wherein the first image comprises a silhouette of a portion of the user.

11. A non-transitory computer-readable storage medium storing a plurality of instructions, the plurality of instructions comprising:
instructions that cause a first system to generate a first image representing a first object relative to a first writing surface based on position information indicative of a position of the first object with respect to the first writing surface, the first object comprising a user using the first system, the first writing surface comprising a component of the first system used for inputting written information;
instructions that cause the first system to generate a first signal comprising the first image and first digital information corresponding to information representing drawings captured at the first system using the first writing surface, wherein a portion of the first image overlaps with a portion of the first digital information; and
instructions that cause the first system to communicate the first signal to a second system generating a display of the first image and the first digital information such that the portion of the first image and the portion of the first digital information that overlap with each other are both visible and distinguishable.

12. The non-transitory computer-readable storage medium of claim 11 wherein the plurality of instructions further comprises:
instructions that cause the first system to receive a second signal comprising the first image; and
instructions that cause the first system to receive a third signal comprising the first digital information;
wherein the instructions that cause the first system to generate the first signal comprise instructions that cause the first system to generate the first signal based upon the second signal and the third signal.

13. The non-transitory computer-readable storage medium of claim 11 wherein the plurality of instructions further comprise instructions that cause the first system to receiving a second signal comprising second digital information corresponding to information representing drawings captured at the second system on a second writing surface of the second system and a second image representing a second object relative to the second writing system.

14. The non-transitory computer-readable storage medium of claim 13 wherein the plurality of instructions further comprise:

instructions that cause the first system to project the second signal onto the first writing surface; and instructions that cause the first system to display the second image and the second digital information such that a portion of the second image and a portion of the second digital information that overlap with each other and are both visible and distinguishable.

15. The non-transitory computer-readable storage medium of claim 11 wherein the instructions that cause the first system to generate the first image comprise:

instructions that cause the first system to receive sensor data captured by one or more sensors, the sensor data representing the position of the first object; and instructions that cause the first system to generate the first image based upon the sensor data.

16. The non-transitory computer-readable storage medium of claim 15 wherein the sensor data comprises at least one of data received from a pressure sensor, data received from a motion sensor, depth information received from a camera, autofocus information received from a camera, data received from a proximity sensor, or data received from an audio recording device.

17. The non-transitory computer-readable storage medium of claim 11 wherein the first image comprises a silhouette of a portion of the user.

* * * * *